United States Patent [19]
Wylde

[11] Patent Number: 5,216,455
[45] Date of Patent: * Jun. 1, 1993

[54] LENS LOCATION BLOCK

[76] Inventor: Stephen J. Wylde, 22 Bath Road, Emsworth, Hampshire P010 7EP, England

[*] Notice: The portion of the term of this patent subsequent to May 19, 2009 has been disclaimed.

[21] Appl. No.: 798,539

[22] Filed: Nov. 26, 1991

Related U.S. Application Data

[63] Continuation of Ser. No. 401,915, Sep. 1, 1989, Pat. No. 5,114,221.

[30] Foreign Application Priority Data

Nov. 30, 1988 [GB] United Kingdom ............... 8827947

[51] Int. Cl.⁵ .............................................. G02C 7/02
[52] U.S. Cl. ..................................... 351/177; 351/168
[58] Field of Search ............... 351/167, 168, 169, 159, 351/161, 177

[56] References Cited

U.S. PATENT DOCUMENTS 3,248,460  4/1966  Naujokas ............................. 351/168

Primary Examiner—Rodney B. Bovernick
Assistant Examiner—Hung Xuan Dang
Attorney, Agent, or Firm—Wood, Herron & Evans

[57] ABSTRACT

A bi-focal or multi-focal lens element or blank of synthetic plastics material is supported by a lens location block releasably molded on to the front face of the lens element or blank, the material of the block being comparatively inexpensive non-metallic material so that the block can be thrown away after the element or blank has been released from the block.

4 Claims, 5 Drawing Sheets

LENS LOCATION BLOCK

This is a continuation of application Ser. No. 401,915, filed Sep. 1, 1989, now U.S. Pat. No. 5,114,221.

This invention relates to bi-focal and multi-focal lens elements or blanks which are supported by lens location blocks, the respective block being releasably moulded on to the front face of the lens element or blank. It also relates to a method and system for manufacturing such block-supported lens elements or blanks and to optical lenses produced from the elements or blanks. In particular, it relates to a method and system wherein a finished lens is fabricated from two lens elements or blanks which are made to adhere to each other while one of them is supported on a lens location block.

It is already known from U.S. Pat. No. 3,877,798 to produce a lens by bonding together two pre-moulded lens elements or blanks of synthetic plastics material, the two elements being made to adhere to each other by means of a clear epoxy resin adhesive. In this form of lens, the front element is moulded with a bi-focal or multi-focal segment in place, while the rear element provides the "distance" power.

It is also known from GB-A-1,134,643 to provide support means for a lens element or blank during manufacture, the support being in the form of a reference plug of an antimony-lead low melting point alloy which is moulded on to the front face of the lens element or blank and which is then later removed before the lens is sent out from the factory. This means that the antimony-lead alloy, which is comparatively expensive, is used over and over again in the factory.

The aim of the present invention is to facilitate the production of a fabricated lens comprising two elements bonded together by making use of already-available mass-produced single vision rear lenses to produce the "distance" power, the lens including a bi-focal or multi-focal element which is thinner than the other element and which is supported on disposable support means so that fabrication of the lens can be carried out at a point of use just as effectively as in the factory.

To this end, the invention is directed to a bi-focal or multi-focal lens element or blank made of synthetic plastics material which is supported by a lens location block releasably moulded on to the front face of the lens element or blank, characterised in that the material of the block is a comparatively inexpensive non-metallic material so that the block can be thrown away after the lens element or blank has been released from the block.

Preferably the block is moulded from a two-pack isocyanate polyurethane containing mineral filler, or from a wax, or from a non-plasticised resin.

If desired, the mould which is used to produce the moulded block can be disposable as well, which means that the mould and the moulded block will remain together until the lens element or blank is released from the block. Such a mould can be pressed out of a thin sheet of mild steel coated with zinc or tin.

Other desirable features of the invention are mentioned in the subsidiary claims.

An example of a block-supported lens blank and an example of a finished lens produced from it are illustrated in the accompanying drawings along with apparatus for producing the block-supported lens blank and for applying thereto another lens element or blank to produce the finished lens.

Figure 1:
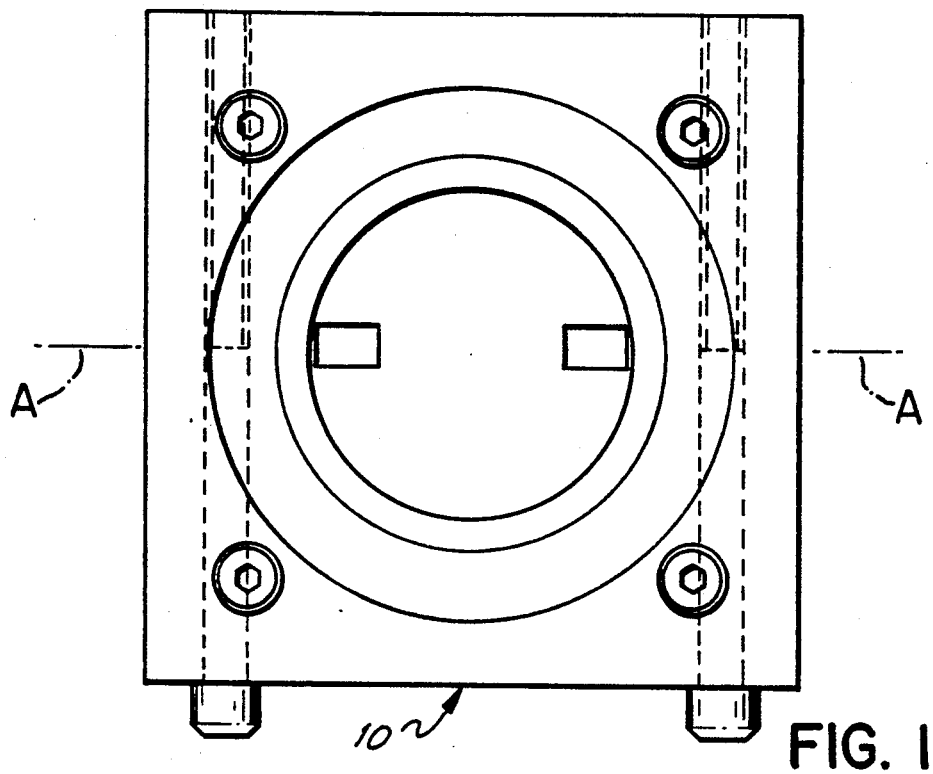
FIG. 1 is plan view of a mould for forming a lens location block on a lens element or blank.
Figure 2:
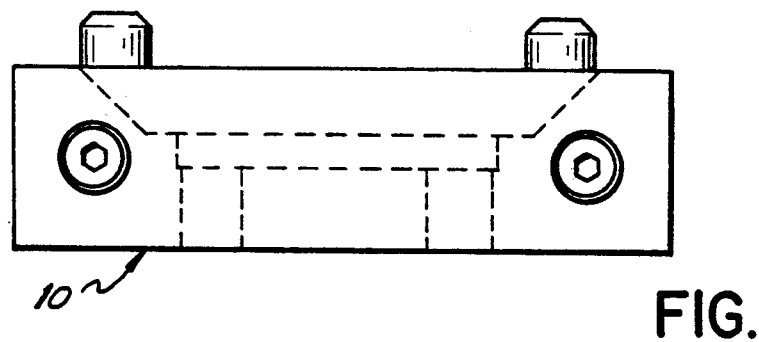
FIG. 2 is a side view of the mould shown in FIG. 1.
Figure 3:
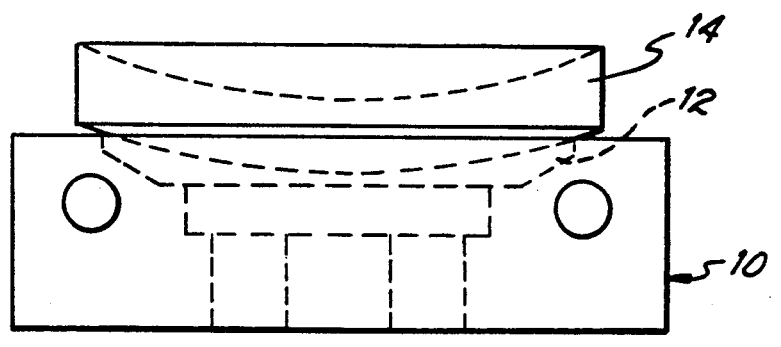
FIG. 3 is a side view of the mould with a lens blank arranged on it.

The mould 10 shown in FIGS. 1–3 has a generally circular upwardly-open mould chamber 12 which is filled with moulding material prior to being closed at its upper end as shown in FIG. 3 by a bi-focal or multi-focal lens blank 14 having a convex lower face 16 and a concave upper face 18. The lens blank 14 is made of a clear synthetic plastics material, preferably that known in the trade as CR39 or a polycarbonate. Prior to being placed on the mould 10, the lens blank 14 has its lower convex face 16 coated with a cellulose which is applied either by painting, spraying or dipping and, once the cellulose has dried, a wax release agent is applied by spraying or painting to the lens blank. After this, the lens blank is placed on the mould 10 to close the mould chamber 12 and a moulding material in the form of a two-pack isocyanate polyurethane containing mineral filler is poured or otherwise injected into the chamber. Alternatively, some other dimensionally-stable non-metallic moulding material such as a wax or a non-plasticised resin can be used as the moulding material. The polyurethane moulding material is then cured at 40° C. for 3 to 4 hours. At this stage, the lens blank 14 is correctly aligned as a right or left eye lens and is made correct for horizontal axis with respect to location or reference lugs 20 (see FIGS. 4 and 5) which are integrally moulded on the lens location block. These lugs are also used to drive the lens location block during subsequent machining of the lens.

Figure 4:
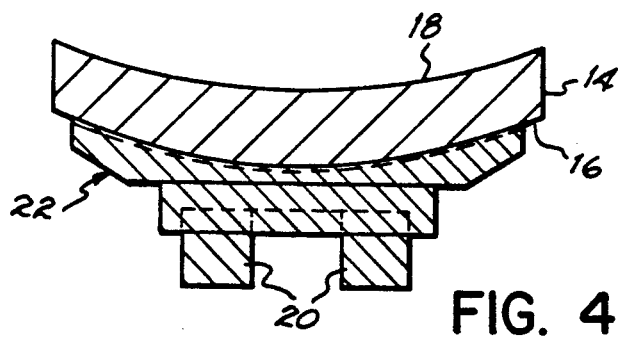
FIG. 4 is a vertical section through the lens location block produced by the mould of FIGS. 1–3 with the lens blank releasably attached to the block.
Figure 5:
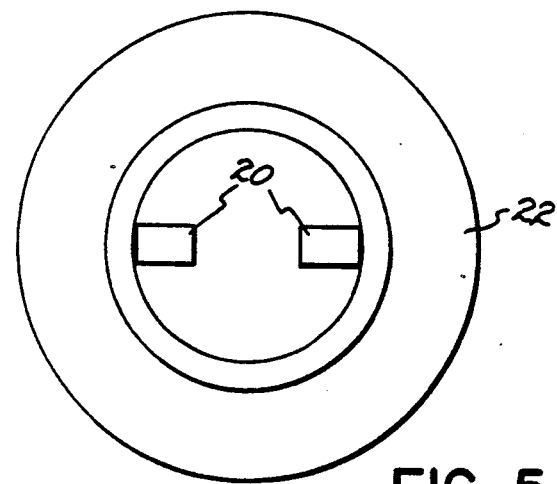
FIG. 5 is an underneath plan view of the lens location block and lens blank shown in FIG. 4.
Figure 6:
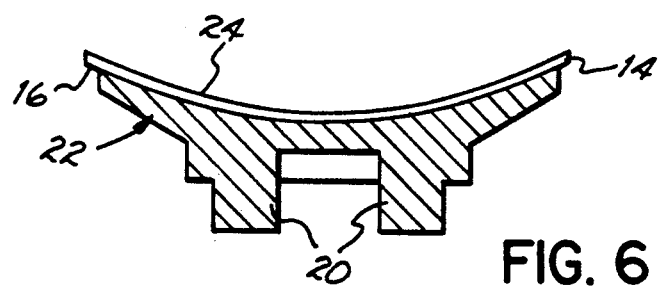
FIG. 6 is a view similar to FIG. 4 showing the lens blank after it has been machined.
Figure 7:
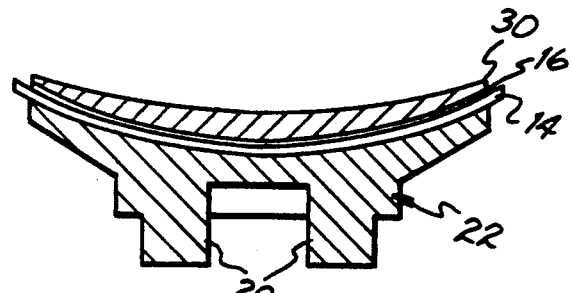
FIG. 7 is a view similar to FIGS. 4 and 6 showing a single-vision distance lens element secured by an ultraviolet curing adhesive to the bi-focal or multi-focal element.

After the moulding material in the mould 10 has been cured, the mould is split open along the line A—A and the moulded block is removed from the mould with the lens blank 14 attached to it. As shown in FIGS. 4 and 5, the moulding material now forms a lens location block 22 which is left for a few days so as to harden completely. Machining of the lens blank 14 now takes place using, for example, a polycrystalline fly cutter in an automatic spherical lens generator. As shown in FIG. 6, this produces a concave upper surface 24 on the thin lens blank ready to match a convex single vision distance lens element to be applied to the thin lens blank 14 on its supporting block at the time of assembly. Because the lens location block 22 is made of comparatively cheap material, it can be thrown away when the lens blank 14 is separated from it. This means that application of a distance lens element to the blank 14 can take place outside the factory, namely, at point-of-sale or retail locations where actual bonding of the two lens elements and dispensing takes place.

Figure 8:
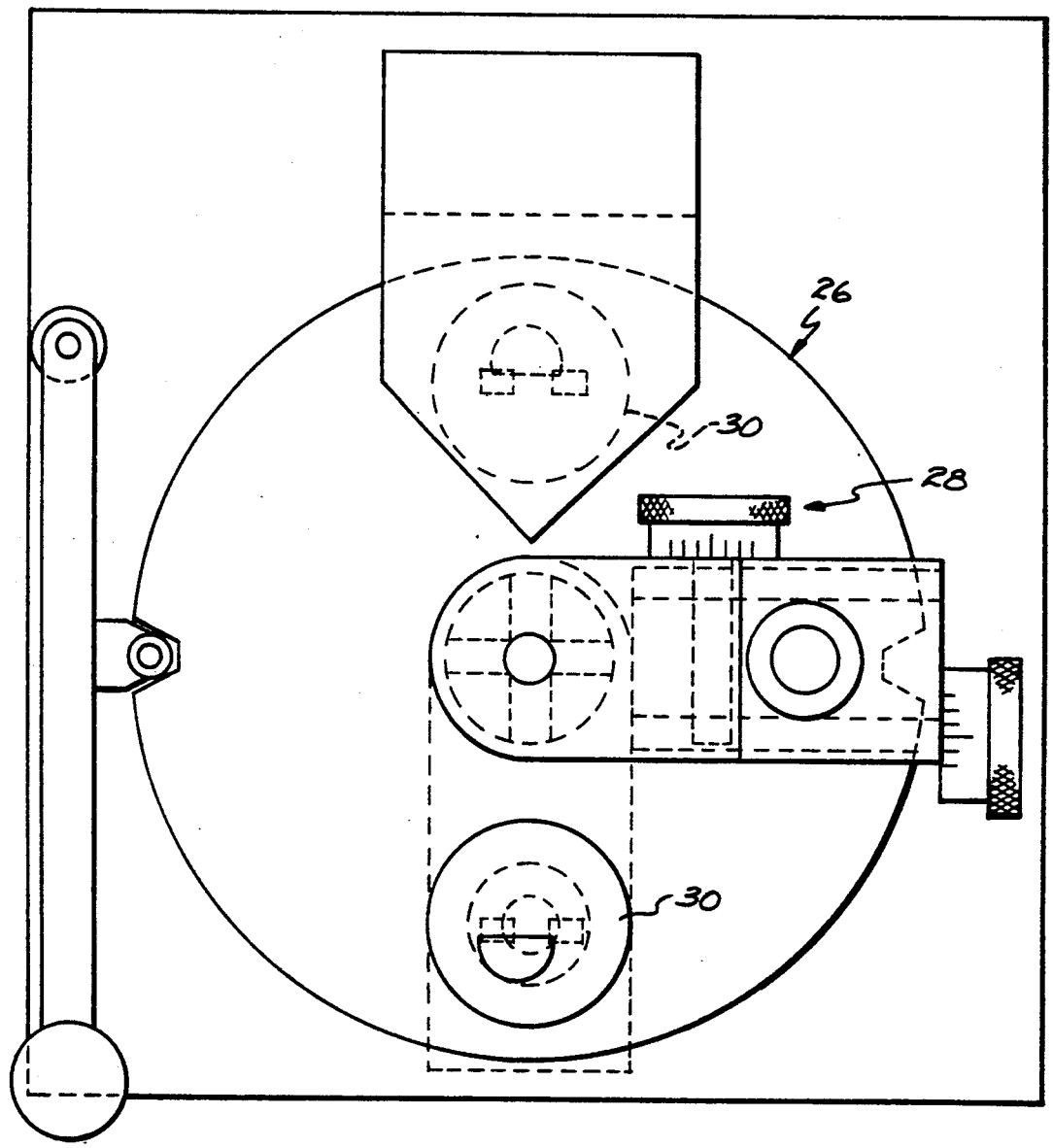
FIG. 8 is a plan view of a lens alignment unit and fixing means which serve to hold the lens location block during application of the distance lens element to the bi-focal or multi-focal element during manufacture.
Figure 9:
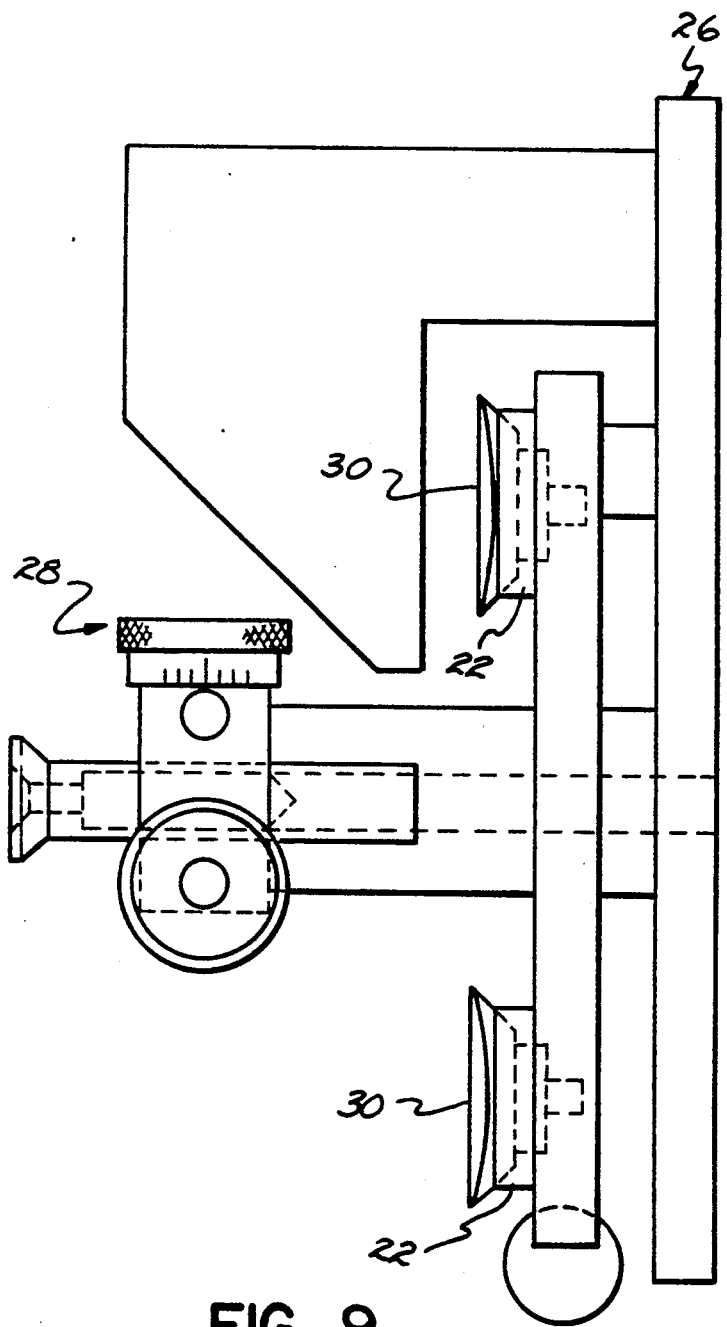
FIG. 9 is a side view of the apparatus shown in Figure.

A lens alignment unit incorporating fixing-means 26 as shown in FIGS. 8 and 9 is used to hold the lens location block 22 and the thin element releasably attached to it in a correct location for horizontal axis in order to bring the upper lens element into bonding contact with the upper concave surface of the lens blank 14. Alignment scales 28 in an adherent-loading position are provided on the alignment fixing means 26 to align the axis of the upper lens element 30, which is likewise made of CR39 material, a polycarbonate or other synthetic plastics material, to the required prescription. Alternatively, the prescription axis can be aligned in a lens measuring instrument (focimeter) and a horizontal mark only made in the concave surface of the lens element 30. This horizontal concave mark will then be de-centred up and out with respect to the multi-focal reference axis in preparation for attaching the upper lens element to the lower lens element.

Figure 10:
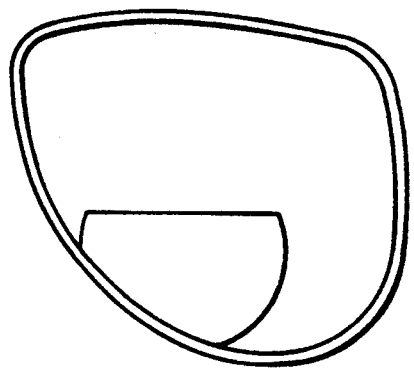
FIG. 10 is a front view of the finished composite lens.
Figure 11:
FIG. 11 is a section through the finished lens shown in FIG. 10.

Attachment of the two lens elements to each other is effected by depositing a metered quantity of ultra-violet curing adhesive on the concave upper surface of the lower lens element. After ensuring that there are no bubbles in the adhesive, the upper lens element is correctly aligned with reference to the previously-applied mark or marks and is pressed on to the adhesive. A 125 Watt ultra-violet light is them brought to within 7.62 cm of the assembly, and in two to three minutes the adhesive is fully cured. The lens location block 22 can now be mechanically disengaged from the composite lens and thrown away, and the dried cellulose coating peeled from the front lens surface. The finished uncut lens can then be inspected and the prescription verified prior to edge profile machining and fitting to a spectacle frame. FIGS. 10 and 11 show the lens in its final form ready for fitting to a spectacle frame.

One major advantage of the invention over the prior methods mentioned in the introductory part of the Specification is that only one lens element is a "special" element. Another advantage is that the lens location block which supports the bi-focal or multi-focal element until after fabrication of the lens has been completed, which is very important in view of its thin section after machining, can then be thrown away after it has been separated from the lens element. In addition to all this, the invention can be used with standard and hard-coated lenses and with any design of bi-focal or multi-focal lens element.

Figure 12:
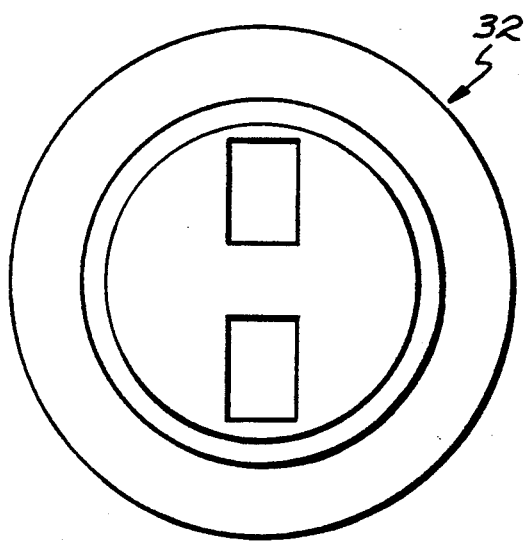
FIG. 12 is a plan view similar to FIG. 1 of a disposable mould made of thin mild steel plate coated with zinc or tin.
Figure 13:
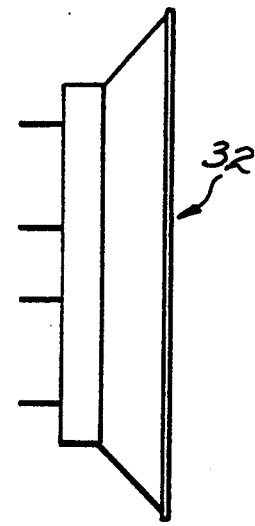
FIG. 13 is a side view of the mould shown in FIG. 12.

If desired, the mould which is used to produce the lens location block can likewise be made disposable by being made of inexpensive material. Thus, FIGS. 12 and 13 show a disposable mould 32 made of pressed-out thin mild steel plate with a thin coating of zinc or tin. Such a mould can remain on the lens location block until the latter is removed from the lens element.

I claim:

1. A lens assembly comprising a lens element or blank made of a clear synthetic plastics material and, attached to a face of the lens element or blank, a lens location block made of a mouldable non-metallic material so as to be moulded onto the face of the lens element or blank, wherein the lens location block is adapted to be driven on a lens-treatment machine for grinding or polishing the lens after the block has been fitted on the lens-treatment machine, and wherein release material is interposed between the said face of the lens element or blank and an opposed face of the lens location block to facilitate subsequent release of the lens element or blank from the block whereby the block can be disposed of after the lens element or blank has been released from the block.

2. A lens assembly according to claim 1, wherein the material of the block is one of the group of materials consisting of a two-pack isocyanate polyurethane, a wax, and a resin.

3. A lens assembly according to claim 1, wherein the release material comprises a release agent applied to the face of the lens element or blank.

4. A lens assembly according to claim 1, wherein the assembly also includes a mould used to mould a part of the lens location block remote from the lens element or blank, the mould being disposable with the block.

* * * * *